E. F. BEUGLER.
LATHE TOOL.

No. 191,560.  Patented June 5, 1877.

Witnesses.

Inventor:
E. F. Beugler
By Dodge & Son
Attys.

UNITED STATES PATENT OFFICE.

EDWARD F. BEUGLER, OF WILLIAMSPORT, PENNSYLVANIA, ASSIGNOR OF ONE-HALF HIS RIGHT TO JOHN DU BOIS.

IMPROVEMENT IN LATHE-TOOLS.

Specification forming part of Letters Patent No. 191,560, dated June 5, 1877; application filed January 31, 1877.

*To all whom it may concern:*

Be it known that I, EDWARD F. BEUGLER, of Williamsport, in the county of Lycoming and State of Pennsylvania, have invented certain Improvements in Lathe-Tools, of which the following is a specification:

My invention relates to that class of tools which consist of a shank or holder, provided with a small detachable cutter or tool, the one shank being designed to receive the various different cutters required in practice, to the end that the latter may be made without the shanks, which it is usual to forge upon them.

I am aware that various tools have been invented consisting of a shank or holder, and a detachable cutter secured therein; but in practice they have been found objectionable on account of their expense, of the insecurity with which they hold the cutters, and of the trouble experienced on account of the cutter being brought in contact with the rest or other parts of the lathe at its lower end.

My invention is designed to overcome the difficulties incident to other tools; and consists in constructing my shank with a lateral oblique socket at one end to receive the cutter or tool, and in making the latter of a curved form, in order to prevent its rear end from projecting below the level of the shank.

Figure 1:
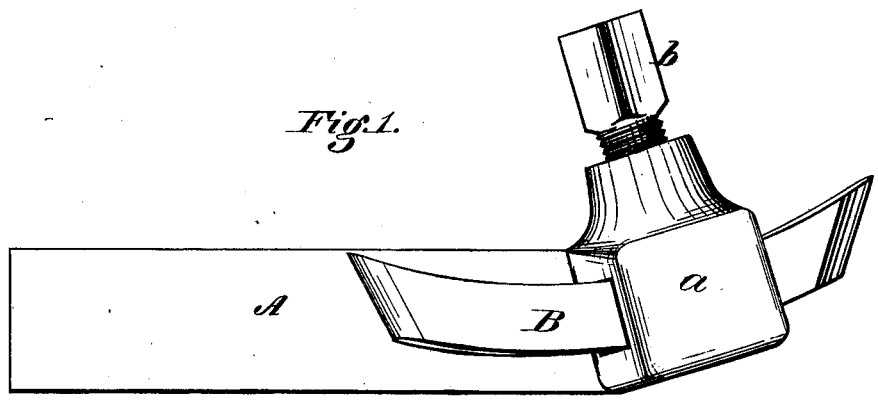
Figure 2:
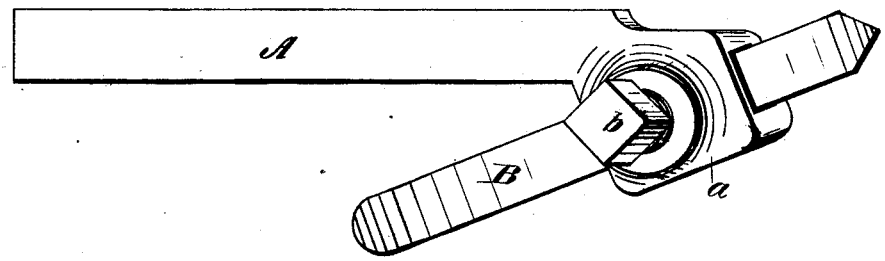

Figure 1 represents a side elevation of my improved tool; Fig. 2, a top-plan view of the same.

The tool consists, simply, of a straight bar or shank, A, having on one end a head or socket, $a$, with the cutter or tool proper, B, passed through it horizontally from the front to the rear end, and secured by a set-screw, $b$, seated in the top of the head, as shown. It will be observed that, by arranging the head obliquely to the shank or body, the tool has its rear end thrown to one side of the latter, so that a cutter of considerable length may be used in my stock without either coming in contact therewith at the rear or projecting below the same so as to be in the way of the rest.

As the tool passes through the head in a nearly horizontal position, the strain on its end has but little tendency to move it endwise, and hence it is held very securely by the screw. In order to give the cutting end of the tool or cutter B the upward inclination which practice has proven to be desirable, and at the same time admit of the tool being made of a considerable length without its lower or rear end being thrown objectionably low, the tool is curved, as shown in the drawing. This curvature gives the tool an upward inclination on each side of the head $a$, and entirely avoids the difficulty which would arise in the use of a long straight tool in an inclined position.

It is obvious that, when desired, the tool may be made straight, however, and also that, in place of the screw, a wedge or other equivalent device may be used to fasten the tool in the stock.

Having thus described my invention, what I claim is—

1. The stock or body A, provided with the oblique head $a$ and the screw $b$, or its equivalent, substantially as and for the purpose shown and described.

2. The combination of the shank or body A, having the oblique head or socket $a$, with the cutter or tool B secured therein, substantially as shown and described.

3. In combination with a shank or body, A, having a head or socket, $a$, a curved cutter or tool, B, substantially as shown and described.

EDWARD F. BEUGLER.

Witnesses:
J. A. LIVINGSTON,
H. L. LIVINGSTON.